Dec. 3, 1929.                C. F. SCOTT                1,738,452
SYSTEM AND APPARATUS FOR TESTING PRIME MOVERS
Filed Sept. 5, 1923
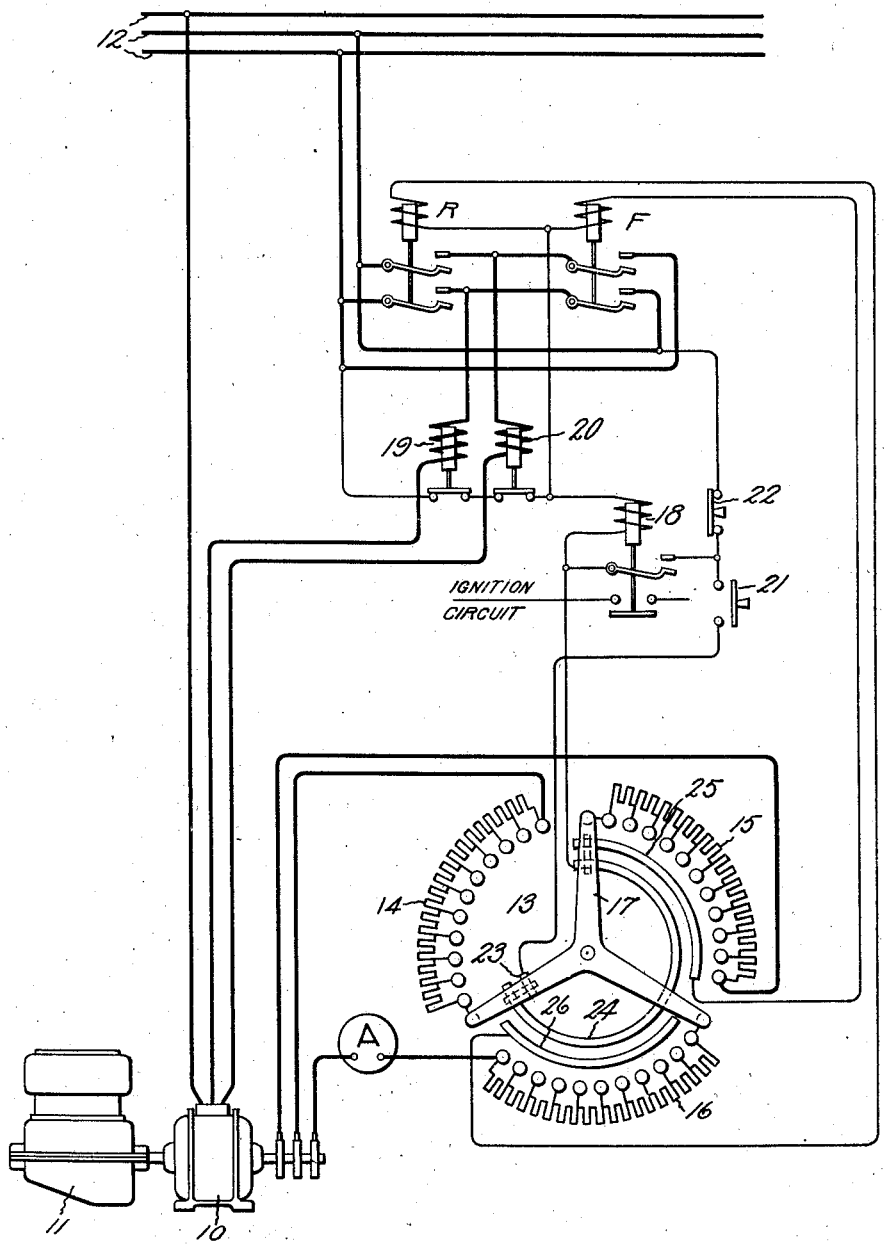
Inventor:
Carl F. Scott,
by  His Attorney.

Patented Dec. 3, 1929

1,738,452

UNITED STATES PATENT OFFICE

CARL F. SCOTT, OF EAST ORANGE, NEW JERSEY, ASSIGNOR TO GENERAL ELECTRIC COMPANY, A CORPORATION OF NEW YORK

SYSTEM AND APPARATUS FOR TESTING PRIME MOVERS

Application filed September 5, 1923. Serial No. 661,070.

My invention relates to improvements in systems and apparatus for testing and lapping in prime movers, and one of the objects of the invention is to provide a system and apparatus having features of simplicity of construction and arrangement and reliability and effectiveness in operation.

A further object of the invention is to provide an arrangement whereby an alternating current dynamo electric machine may be used as a motor to drive the prime mover or as a generator to supply a load for the prime mover.

Another object of the invention is to provide an arrangement in which a variable resistance rheostat included in the secondary circuit of the dynamo electric machine may be used to regulate the speed of the machine when operating as a motor and to regulate the load on the prime mover when the machine operates as a generator.

A still further object of the invention is to provide an arrangement whereby the speed-load regulating rheostat must be in a predetermined position in order to connect the machine to a source of supply, and whereby operating the rheostat in one direction successively increases the speed of the machine operating as a motor, then reverses the connection of the machine to the source of supply, and finally decreases the resistance in the secondary circuit of the machine in order to regulate the load on the prime mover.

These, and other objects of the invention as will be either apparent to those skilled in the art or as will be pointed out particularly hereinafter, are attained in the system and apparatus shown in very diagrammatic form in the accompanying drawing.

Referring to the drawing, the dynamo electric machine 10 which is indicated as of the three-phase, wound rotor or secondary type, is arranged to be connected to the prime mover 11 which is very diagrammatically illustrated as an internal combustion engine. The dynamo electric machine 10 is arranged to operate as a motor, receiving energy from the three-phase source of supply 12 to drive the prime mover 11 in order to "lap in" the rotating or other movable parts of the prime mover, and the dynamo electric machine is arranged to operate as a generator when the prime mover is running under power so as to furnish a load on the prime mover. To this end, a speed-load regulating rheostat 13 is included in the secondary circuit of the machine 10. The rheostat is indicated as of the type having variable resistors 14, 15 and 16 included in the respective phases of the secondary circuit of the machine, and a manually operable or controlled contact element 17, having three arms which cooperate with the respective resistances, is provided for varying the amount of the resistance included in the secondary circuit of the machine.

Electromagnetic reversing switch mechanism is provided for connecting the machine 10 to the source of supply for the forward and reverse direction of operation. This mechanism comprises the electromagnetic switch or contactor F for the forward direction of operation and the electromagnetic switch or contactor R for the reverse direction of operation. These contactors are under the control of the rheostat 13, and the arrangement is such that the regulating arms of the rheostat must be in the position indicated in the drawing at which all of the resistance is included in the secondary circuit of the machine before either one of the contactors F or R can be energized to connect the machine 10 to the supply circuit 12. This is to insure that sufficient protective resistance will be included in the secondary circuit of the machine preparatory to starting the same as a motor by connecting to the supply circuit. One of the arms of the contact element 17 carries a contact member insulated therefrom and arranged so that in the position illustrated, connection is made through segments 23 and 24, and another arm carries a similar insulated contact member arranged to connect segments 24 and 25 when element 17 is in the position shown and segments 24 and 26 when element 17 has been rotated one step more than 120° clockwise.

The electromagnetic switch or relay 18 is provided for protecting the equipment in case the source of supply should fail. The arrangement is such that in case the source of supply should fail, the relay 18 will automatically open and thus open the ignition circuit of the prime mover in case the prime mover is an internal combustion engine, or to control valve mechanism in case the prime mover is of the type which employs a motive fluid such as steam or the like, thereby preventing over-speeding of the prime mover in case the load on the prime mover is relieved, as would be the case if the source of supply 12 should fail. This relay also prevents the reclosure of the reversing switches after the same are automatically opened in response to an abnormal circuit condition, such as a failure of the source or an overload.

The current limit relays 19 and 20 are included in respective phase conductors of the machine 10 to prevent the overloading of the dynamo electric machine, and the arrangement is such that in case either one or both of these relays should operate due to an overload, the forward or reversing contactor which had been closed will be automatically opened and the relay 18 will also be automatically opened, thereby disconnecting the machine 10 from the supply circuit and requiring that the speed-load regulating rheostat be returned to the position indicated in the drawing in order to again connect the dynamo electric machine to the source of supply. The manually operable start push button 21 and the manually operable stop button 22 are provided for giving a remote manual control of the equipment.

As thus constructed and arranged, and with the parts in their respective positions shown in the drawing, the operation of my invention is as follows: In order to energize the dynamo electric machine for operation in the forward direction as a motor to lap in the prime mover 11, the start push button 21 will first be closed, thereby energizing the protective relay 18 to close, the circuit being from the middle supply conductor of the source of supply 12 through the stop push button 22, start push button 21, the small segment 23 of the rheostat 13, segment 24, through the winding of the relay 18 and the contacts of the overload relays 20 and 19 to the lower supply conductor. The relay 18 will thereupon close and be maintained closed through an energizing circuit which includes the contacts of the relay, as will be apparent to those skilled in the art. The start push button 21 may thus be opened, since the relay 18 will remain closed. The closing of relay 18 energizes the forward contactor F to close, the circuit being from the middle supply conductor of the source of supply 12 through the stop push button 22, contacts of relay 18, segment 24 of the rheostat 13, segment 25 of this rheostat, winding of contactor F through the contacts of the overload relays 20 and 19 to the lower supply conductor. The dynamo electric machine 10 will now start and operate as a motor at its lowest speed with all of the resistors 14, 15 and 16 included in the secondary circuit of the machine. In order to increase the speed of the dynamo electric machine and the prime mover being tested, the manually operable contact mechanism 17 of the rheostat will be moved in the clockwise direction, thereby reducing the resistance in the secondary of the machine 10 and increasing the speed. If the prime mover is now operated under its own power and the speed is increased so that the machine 10 runs at a speed greater than the synchronous speed thereof, this machine will operate as an asynchronous generator returning power to the supply circuit. The load on the prime mover may be regulated by a proper regulation of the rheostat 13. If it is desired to furnish a load for the prime mover at a speed of the machine 10 which is less than the synchronous speed thereof, the rheostat contact mechanism is moved through 120 degrees. The forward contactor F will be deenergized at the 120 degree position and the reversing contactor R will be energized through the segment 26 by a continuation of the movement of the rheostat, thus reversing the connection of the machine to the source of supply. It has been assumed that the prime mover 11 is now operating under its own power and that it is desired to employ the dynamo electric machine to furnish a load for the prime mover. The speed of the prime mover will be such that the dynamo electric machine will be driven counter to its motor torque at a speed which is below the synchronous speed thereof in order that the dynamo electric machine may be effective to operate as a brake on the prime mover, dissipating power in the resistors 14, 15 and 16. It will be noticed that when the rheostat contact mechanism has been moved through the 120 degree position, as above explained, the entire resistors 14, 15 and 16 are included in respective phases of the secondary circuit of the machine. This will give the smallest load supplied by the dynamo electric machine. In order to increase the load, the clockwise movement of the rheostat arm will be continued, thereby reducing the resistance in the secondary circuit and thus increasing the load supplied by the dynamo electric machine. This load may be regulated with a great nicety by moving the rheostat arms back and forth as desired. In case the speed of the prime mover is further decreased, the rheostat provides a means of regulating the load to a nicety.

In case the source of supply should fail either when the machine 10 is operating as a motor or as a load on the prime mover, the relay 18 will automatically open, thereby opening the ignition circuit of the prime mover or in any suitable way effect the shutdown of the prime mover, and at the same time cause the particular contactor F or R which had been closed, to automatically open. In order to again connect the dynamo electric machine to the source of supply, it will be necessary to return the controller contact arms to their respective positions shown in the drawing and thereby insure that the machine 10 cannot be connected to the source of supply unless all of the protective and regulating resistance is included in its secondary circuit.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

1. The combination with an alternating current dynamo electric machine of the wound rotor type arranged either to operate as a motor or to be driven to supply a load, a variable resistance rheostat included in the secondary of said machine, electroresponsive switch mechanism for connecting said machine to a source of supply for forward or reverse motor operation, and electrical connections between the said rheostat and the said switch mechanism through which the rheostat is effective to control the switch mechanism, whereby operating the said rheostat in one direction successively reduces the resistance in the secondary circuit of said machine, and then effects the operation of said switch mechanism to reverse the connection of the machine to the source of supply and includes the resistance of the rheostat in the secondary of said machine, and then reduces the effective resistance of said rheostat.

2. The combination with an alternating current dynamo electric machine of the wound rotor type arranged either to operate as a motor or to be driven to supply a load, a variable resistance rheostat included in the secondary of said machine, electroresponsive switch mechanism for connecting the machine to a source of supply for forward or reverse operation, and electrical connections between the said rheostat and the said switch mechanism through which the rheostat effects control of the switch mechanism, whereby the said rheostat must be in a position to include a substantial part of the resistance of said rheostat in the secondary of said machine in order to energize the switch mechanism for forward operation, and a subsequent movement of the rheostat in one direction successively decreases the effective portion of the resistance of the rheostat, then effects the operation of said switch mechanism to reverse the connection of the machine to the source of supply, and then decreases the effective portion of the resistance of said rheostat.

3. The combination with an alternating current motor of the wound rotor type, of a variable rheostat for the rotor circuit of said motor so arranged that operation of the rheostat in a predetermined direction successively inserts resistance in said rotor circuit and thereafter decreases said resistance, switching means for connecting said motor for forward or reverse operation, and an operating connection between said rheostat and said switching means whereby when said rheostat is operated in said predetermined direction, said motor is connected for forward and reverse operation alternately each time a substantial amount of the resistance of said rheostat is inserted in said rotor circuit.

4. The combination with a prime mover, of an alternating current motor connected thereto, said motor being provided with a wound rotor, a variable rheostat for the rotor circuit of said motor, said rheostat being so arranged that operation of said rheostat in a predetermined direction successively decreases and increases the resistance included in said rotor circuit, a source of electrical supply for said motor, switching means for connecting said motor to said source for forward or reverse operation, an operating connection between said rheostat and said switching means whereby when said rheostat is moved to a predetermined position in which a substantial part of the resistance of said rheostat is included in said rotor circuit said switching means is operated to connect said motor for forward operation, and an operating connection between said rheostat and said switching means whereby after said rheostat has been subsequently moved to decrease the resistance in said rotor circuit, said switching means is operated to connect said motor for reverse operation after which the resistance in said rotor circuit can be decreased by continued movement of said rheostat in the same direction.

CARL F. SCOTT.